(12) United States Patent
Guo

(10) Patent No.: US 10,509,266 B2
(45) Date of Patent: Dec. 17, 2019

(54) PHOTO ALIGNMENT BENCH, PHOTOALIGNMENT DEVICE AND CONTROL METHOD THEREOF

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Yuanhui Guo, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 15 days.

(21) Appl. No.: 15/972,426

(22) Filed: May 7, 2018

(65) Prior Publication Data
US 2019/0033667 A1 Jan. 31, 2019

(30) Foreign Application Priority Data
Jul. 28, 2017 (CN) .......................... 2017 1 0637523

(51) Int. Cl.
*G02F 1/1337* (2006.01)
*G02F 1/13* (2006.01)

(52) U.S. Cl.
CPC ...... *G02F 1/133788* (2013.01); *G02F 1/1303* (2013.01)

(58) Field of Classification Search
CPC ......................... G02F 1/133788; G02F 1/1303
See application file for complete search history.

(56) References Cited

U.S. PATENT DOCUMENTS
2015/0227056 A1  8/2015  Hur et al.

FOREIGN PATENT DOCUMENTS
| CN | 103765303 A | 4/2014 | |
| CN | 104849965 A | 8/2015 | |
| WO | WO-2017118196 A1 * | 7/2017 | ....... G02F 1/133528 |

OTHER PUBLICATIONS
First Office Action for Chinese Patent Application No. 201710637523.0 dated Sep. 5, 2019.

* cited by examiner

*Primary Examiner* — Hina F Ayub
(74) *Attorney, Agent, or Firm* — Calfee, Halter & Griswold LLP

(57) ABSTRACT

A photo alignment bench, a photo alignment device and a control method thereof. Specifically, the photo alignment bench may include: a platform for supporting a substrate to be aligned; a plurality of photosensitive resistors arranged on a side of the platform for supporting the substrate to be aligned; and a signal transmitter and a signal receiver. The signal transmitter and the signal receiver are electrically connected with two ends of each photosensitive resistor respectively, wherein the signal transmitter is adapted for transmitting an initial electric signal to the photosensitive resistors, and the signal receiver is adapted for receiving an electric signal output from the photosensitive resistors.

20 Claims, 3 Drawing Sheets

PHOTO ALIGNMENT BENCH, PHOTOALIGNMENT DEVICE AND CONTROL METHOD THEREOF

CROSS REFERENCE TO RELATED APPLICATION(S)

The present application claims priority to Chinese patent application No. 201710637523.0 filed on Jul. 28, 2017, the entire disclosure of which is incorporated herein by reference.

TECHNICAL FIELD

The present disclosure relates to the field of display technologies, and in particular to a photo alignment bench, a photo alignment device and a control method thereof.

BACKGROUND ART

Typically, a liquid crystal display (LCD) panel includes an array substrate and a color filter substrate aligned with each other, as well as a liquid crystal layer sealed between the array substrate and the color filter substrate. The liquid crystal display panel includes a pixel electrode and a common electrode for forming an electric field. The electric field is generated between the pixel electrode and the common electrode by applying a voltage, so as to control alignment of liquid crystal molecules in the liquid crystal layer. Furthermore, an image can be displayed by controlling a polarization direction of incident light. Prior to application of the voltage, it is necessary to render the liquid crystal molecules to be in an initial alignment.

Available approaches for rendering the liquid crystals to be in an initial alignment include contact rubbing alignment and non-contact photo alignment. In rubbing alignment, a lint roller is used for rubbing a surface of a film to be aligned, and a physical pressure is applied, such that molecules in a surface layer of the film to be aligned are arranged in a particular direction. When the roller rubs the film to be aligned, residual dust particles, static electricity and other rubbing defects will be easily caused, which influences the product yield.

In light of the above discussion, at present, photo alignment has been gradually adopted in the industry to replace the conventional physical rubbing alignment, such that the liquid crystal molecules are regularly arranged in a fixed direction and thus have an initial alignment. In photo alignment, polarized light is obtained by allowing light (usually UV light) emitted from a light source to pass through a polarizer, and then the polarized light is used to irradiate a film to be aligned (e.g., polyimide film, PI film for short) on a substrate. In this way, the film is aligned, and optical anisotropy is introduced to the surface layer thereof. As compared with rubbing alignment, photo alignment can effectively promote the product yield and the stability of production devices.

In photo alignment, a lamp strip consisting of UV light sources and a platform for carrying a substrate to be aligned are usually configured to move at a constant speed with respect to each other, thereby initially aligning a surface of the entire substrate to be aligned. Due to influences of various factors such as manufacturing process, service life and work period, an energy magnitude of the UV light irradiating each position of the substrate to be aligned may vary. Meanwhile, the moving speed of the lamp strip also influences the energy magnitude of the UV light on the substrate to be aligned. In relevant approaches, the energy magnitude of the UV light irradiating each position of the substrate to be aligned cannot be detected locally. In this case, for the purpose of ensuring that a desired alignment effect can be achieved in all positions of the substrate to be aligned, one can only improve overall the light intensity of the UV light source on the substrate to be aligned. However, this will greatly increase the energy consumption of the UV light source and result in a rising cost. Meanwhile, for a position of the substrate to be aligned where the alignment effect can be achieved in the first place, overexposure will occur in this position due to the general increase in the energy consumption of the UV light source. Overexposure may cause damage to the performance of thin-film transistors (TFTs) on the substrate to be aligned, thereby influencing the electronic performance of the product. Moreover, overexposure may also cause deterioration of dyes in the color filter materials of the substrate to be aligned, thereby influencing the optical performance of the product.

SUMMARY

According to one aspect of the present disclosure, a photo alignment bench is provided. Specifically, the photo alignment bench includes: a platform for supporting a substrate to be aligned; a plurality of photosensitive resistors arranged on a side of the platform for placing the substrate to be aligned; and a signal transmitter and a signal receiver. Furthermore, the signal transmitter and the signal receiver are electrically connected with two ends of each photosensitive resistor respectively, wherein the signal transmitter is adapted for transmitting an initial electric signal to the photosensitive resistors, and the signal receiver is adapted for receiving an electric signal output from the photosensitive resistors.

In certain exemplary embodiments, in the photo alignment bench provided by an embodiment of the present disclosure, the plurality of photosensitive resistors are arranged uniformly in a form of matrix.

In certain exemplary embodiments, in the photo alignment bench provided by an embodiment of the present disclosure, the plurality of photosensitive resistors are arranged in columns on the platform, and the signal transmitter transmits a same initial electric signal simultaneously to the photosensitive resistors in a same column.

Furthermore, the photo alignment bench provided by an embodiment of the present disclosure further includes a layer of flattening material. Specifically, the layer of flattening material is arranged on a side of the photosensitive resistors for receiving light, such that incident light impinges on the photosensitive resistors at a reduced intensity.

In certain exemplary embodiments, in the photo alignment bench provided by an embodiment of the present disclosure, the layer of flattening material includes a filter.

In certain exemplary embodiments, in the photo alignment bench provided by an embodiment of the present disclosure, a distance between any two adjacent photosensitive resistors arranged on the platform is in a range of 1 mm-100 mm.

According to another aspect of the present disclosure, a photo alignment device is further provided. Specifically, the photo alignment device includes the photo alignment bench as described in any of the above embodiments and an alignment light source. Furthermore, the alignment light source includes a linear light source, and is configured to emit light towards the photo alignment bench. Besides, the photo alignment bench is configured to reciprocate relative to the alignment light source in a linear direction. Alternatively, the alignment light source is configured to reciprocate relative to the photo alignment bench in a linear direction. In this case, a length direction of the alignment light source (i.e., a linear extension direction of the linear light source) is perpendicular to the linear direction.

In certain exemplary embodiments, in the photo alignment device provided by an embodiment of the present disclosure, the alignment light source includes a plurality of spot light sources arranged in rows, and the plurality of spot light sources together form a linear light source.

Furthermore, the photo alignment device provided by an embodiment of the present disclosure further includes a movement rail for receiving the photo alignment bench or the alignment light source. Besides, an extension direction of the movement rail is the same as the linear direction.

In certain exemplary embodiments, the photo alignment device provided by an embodiment of the present disclosure further includes a driver. Specifically, the driver is arranged at an end of the movement rail in the extension direction thereof. In addition, the driver is configured to be fixedly connected with an end of the photo alignment bench, and thus drive the photo alignment bench to reciprocate in the linear direction within the movement rail. Alternatively, in other embodiments, the driver is configured to be fixedly connected with an end of the alignment light source, and thus drive the alignment light source to reciprocate in the linear direction within the movement rail.

Furthermore, the photo alignment device provided by an embodiment of the present disclosure further includes a controller. Specifically, the controller is electrically connected with the signal receiver and the alignment light source respectively. Moreover, the controller is configured to compare the electric signal received by the signal receiver with a standard value, and adjust a light intensity of the alignment light source based on a comparison result.

In certain exemplary embodiments, in additional to the driver, the photo alignment device provided by an embodiment of the present disclosure further includes a controller. Specifically, the controller is connected with the driver, so as to adjust a driving force applied to the photo alignment bench or the alignment light source by the driver.

According to yet another aspect of the present disclosure, a method for controlling a photo alignment device is further provided. Specifically, the control method comprises steps of: controlling the signal transmitter to transmit an initial electric signal; controlling the alignment light source to emit light towards the photo alignment bench; controlling one of the photo alignment bench and the alignment light source to reciprocate with respect to the other in a linear direction; and controlling the signal receiver to receive an electric signal output from the photosensitive resistors, and adjusting based on the output electric signal a light intensity of the alignment light source and/or a moving speed of the one of the photo alignment bench and the alignment light source in the linear direction.

Furthermore, according to an embodiment of the present disclosure, when the photo alignment device further includes a driver, the step of controlling the signal receiver to receive an electric signal output from the photosensitive resistors and adjusting based on the output electric signal a light intensity of the alignment light source includes: comparing the electric signal output from the photosensitive resistors with a standard value, and adjusting a light intensity of the alignment light source corresponding to a photosensitive resistor in a position where an abnormal comparison result occurs.

BRIEF DESCRIPTION OF DRAWINGS

In order to illustrate embodiments of the present disclosure more clearly, the following drawings are provided and described briefly below. The drawings below only represent some embodiments of the present disclosure. For a person having ordinary skill in the art, other embodiments of the invention disclosed herein will also be apparent.

FIG. 7 shows graphs for the electric signals received by a signal receiver after passing through each photosensitive resistor according to an embodiment of the present disclosure;

FIG. 8 shows a schematic structure view for a photo alignment device according to another embodiment of the present disclosure;

FIG. 9 is a flow chart showing a method for controlling the photo alignment device according to an embodiment of the present disclosure; and FIG. 10 is a flow chart showing a method for controlling the photo alignment device according to another embodiment of the present disclosure.

DETAILED DESCRIPTION OF EMBODIMENTS

Technical solutions in embodiments of the present disclosure shall be described clearly and completely as follows with reference to the drawings in embodiments of the present disclosure. The embodiments described below are only part of the embodiments of the present disclosure, rather than all embodiments within the scope of the disclosure. The disclosure includes all other embodiments apparent to a person having ordinary skill in the art, starting from the embodiments as described in the present disclosure, In the depictions below, various components involved in embodiments of the present disclosure are indicated respectively by reference signs as follows: 01-photo alignment bench; 02-alignment light source; 021-spot light source; 10-platform; 20-photosensitive resistor; 30-signal transmitter; 40-signal receiver; 50-substrate to be aligned; 60-layer of flattening material; 70-movement rail; 80-driver; 90-controller; X-linear direction; Y-length direction of alignment light source; and Z-extension direction of movement rail. Note that "photosensitive resistor" or "photosensitive resistors" may also be referred to as "photosensitive resistance" or "photosensitive resistances," respectively, herein.

Figure 1:
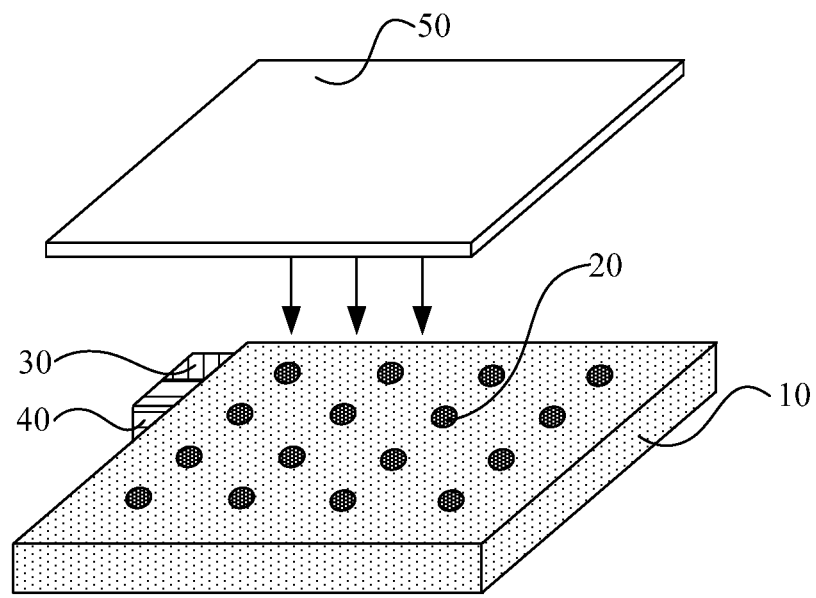
FIG. 1 shows a schematic structure view of a photo alignment bench according to an embodiment of the present disclosure.

A photo alignment bench is provided in an embodiment of the present disclosure. As shown in FIG. 1, the photo alignment bench can include: a platform 10 for supporting a substrate 50 to be aligned; a plurality of photosensitive resistors 20 arranged on a side of the platform 10 for placing the substrate 50 to be aligned; as well as a signal transmitter 30 and a signal receiver 40. Specifically, the signal transmitter 30 and the signal receiver 40 are electrically connected with two ends of each photosensitive resistor 20 respectively, wherein the signal transmitter 30 is adapted for transmitting an initial electric signal to the photosensitive resistors 20, and the signal receiver 40 is adapted for receiving an electric signal output from the photosensitive resistors 20.

It should be noted that in the photo alignment device provided by an embodiment of the present disclosure, the substrate 50 to be aligned is placed on the platform 10 (the substrate 50 to be aligned is placed on the platform 10 in a direction as shown in FIG. 1), and the substrate 50 to be aligned is photo-aligned by means of an alignment light source. Usually, the alignment light source is a strip light source arranged in a length or width direction of the substrate 50 to be aligned. In this case, through a relative movement between the platform 10 and the alignment light source, the strip light source can accomplish irradiation of the entire substrate 50 to be aligned, thereby achieving photo alignment of the substrate 50 to be aligned. In the photo alignment substrate provided by an embodiment of the present disclosure, the major focus is not the relative movement between the platform 10 and the alignment light source. Thus, there is no special requirement for whether the platform 10 is movable or not.

It should also be noted that the photosensitive resistor 20 is usually made of semiconductor materials, such as cadmium sulfide or cadmium selenide, and a resistance value thereof varies with a light intensity received on its light receiving face. In other words, the photosensitive resistor 20 is sensitive to lighting, and complies with the internal photoelectric effect. Specifically, the higher the light intensity received on the light receiving face of the photosensitive resistor 20, the lower the resistance value thereof is. When the light intensity is very high, the bright-state resistance value of the photosensitive resistor 20 can be lower than 1KΩ. In contrast, when the light intensity received on the light receiving face of the photosensitive resistor 20 is low or even absent, the photosensitive resistor 20 is in a high resistance state, and the dark-state resistance value thereof can be 1.5MΩ. By transmitting an initial electric signal to the photosensitive resistor 20 from the signal transmitter 30 and receiving an output electric signal by the signal receiver 40, a corresponding light intensity on the light receiving face of the photosensitive resistor 20 can be obtained based on the resistance value of the photosensitive resistor 20.

As shown in FIG. 1, a plurality of photosensitive resistors 20 are arranged on a side of the platform 10 for placing the substrate 50 to be aligned, and the signal transmitter 30 and the signal receiver 40 are electrically connected with two ends of each photosensitive resistor 20 respectively. In this case, the signal transmitter 30 transmits an initial electric signal to each photosensitive resistor 20, and the signal receiver 40 receives an electric signal output from each photosensitive resistor 20. In order to avoid influencing display of the drawings due to complicated wirings, in FIG. 1, connection lines between the signal transmitter 30 or the signal receiver 40 and each photosensitive resistor 20 are not shown. In this way, the light intensity in a position where a photosensitive resistor 20 is arranged can be detected. The number and positions of the photosensitive resistors 20 are not specifically limited herein. As an example, a plurality of photosensitive resistors 20 can be arranged respectively in a plurality of specific positions on the platform 10, so as to detect the light intensity in these specific positions. Alternatively, a plurality of photosensitive resistors 20 can be arranged uniformly in the form of matrix on a surface of the platform 10, so as to achieve detection of the light intensity on the entire platform 10.

Furthermore, it should be pointed out further that the signal transmitter 30 is electrically connected with two ends of each photosensitive resistor 20 respectively. Therefore, an initial electric signal, i.e., an initial voltage value, can be transmitted from the signal transmitter 30 to each photosensitive resistor 20. In this case, since the light intensity received on the light receiving face of each photosensitive resistor 20 is different, the resistance value of each photosensitive resistor 20 is different too. In light of that, after the initial electric signal passes thorough the photosensitive resistor 20, the initial voltage will drop correspondingly due to the influence of the resistance value, and the dropped output voltage value is namely the electric signal output from the photosensitive resistor 20. In this case, the resistance value of the photosensitive resistor 20 can be obtained by calculating a difference between the initial electric signal and the output electric signal.

Besides, in the photo alignment bench provided by an embodiment of the disclosure, the positions where the signal transmitter 30 and the signal receiver 40 are arranged on the platform 10 can be selected flexibly upon actual needs. In an example, as shown in FIG. 1, the signal transmitter 30 and the signal receiver 40 can be both arranged at a same side of the platform 10. Alternatively, the signal transmitter 30 and the signal receiver 40 can also be arranged at different sides of the platform 10. Obviously, any other suitable arrangement can be adopted, as long as it can be ensured that the signal transmitter 30 and the signal receiver 40 are electrically connected with two ends of each photosensitive resistor 20 respectively.

A photo alignment bench is provided in an embodiment of the present disclosure. Specifically, the photo alignment bench includes: a platform for supporting a substrate to be aligned; a plurality of photosensitive resistors arranged on a side of the platform for placing the substrate to be aligned; as well as a signal transmitter and a signal receiver. Furthermore, the signal transmitter and the signal receiver are electrically connected with two ends of each photosensitive resistor respectively, wherein the signal transmitter is adapted for transmitting an initial electric signal to the photosensitive resistors, and the signal receiver is adapted for receiving an electric signal output from the photosensitive resistors. A plurality of photosensitive resistors 20 are arranged on a side of the platform for placing the substrate to be aligned, and the signal transmitter and the signal receiver are electrically connected with two ends of each photosensitive resistor respectively. Besides, the signal transmitter transmits an initial electric signal to the photosensitive resistors, and the signal receiver receives an electric signal output from the photosensitive resistors. In this case, since the photosensitive resistors can alter their resistance values with changes in the light intensities received thereby, the electric signal output from the photosensitive resistors and received by the signal receiver will be different in different lighting conditions. Therefore, by calculating the resistance value of each photosensitive resistor arranged on the platform, the light intensity in a corresponding position can be detected. In this way, light intensity information in each local position of the substrate to be aligned can be obtained. By means of the local light intensity information, the light intensity of the corresponding alignment light source can be adjusted. This helps to improve the photo alignment uniformity of the substrate to be aligned, reduce possible damages to the substrate to be aligned due to overexposure in a local area, and improve the optical performance of the product.

In certain exemplary embodiments, as shown in FIG. 1, a plurality of photosensitive resistors 20 are distributed uniformly in the form of matrix on a side of the platform 10 for placing the substrate 50 to be aligned.

In this way, as shown in FIG. 1, with the plurality of photosensitive resistors 20 distributed uniformly in the form of matrix, the entire surface of the substrate 50 to be aligned can be covered. Thus, the local light intensity in each position on the entire surface of the substrate 50 to be aligned can be detected.

Figure 3:
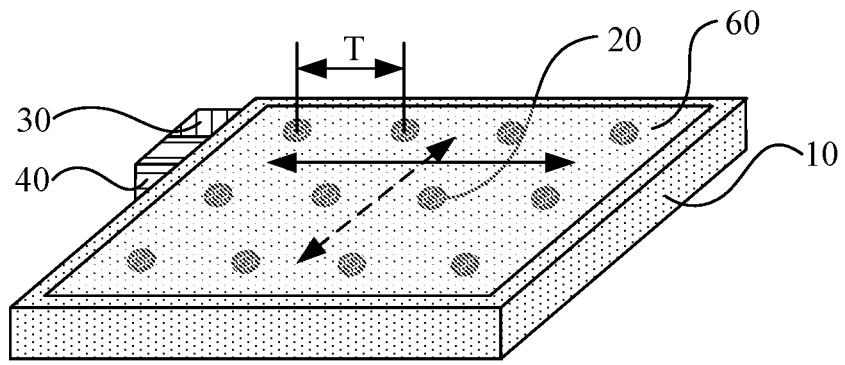
FIG. 3 shows a schematic structure view for a photo alignment bench according to yet another embodiment of the present disclosure.

In certain exemplary embodiments, the plurality of photosensitive resistors 20 are arranged in columns on the platform 10. Further, the signal transmitter 30 transmits simultaneously a same initial electric signal to the three photosensitive resistors 20 in the same column respectively. As shown in FIG. 3, the photosensitive resistors 20 are arranged in four columns on the platform 10, wherein each column consists of three photosensitive resistors 20, and the signal transmitter 30 transmits simultaneously a same initial electric signal to the three photosensitive resistors 20 in the same column respectively.

In this way, when the alignment light source is a linear light source which moves in a row arrangement direction of the photosensitive resistors 20 to perform photo alignment on the substrate 50 to be aligned, a distance between the plurality of photosensitive resistors 20 in the same column and the linear light source is the same in any moment, and the photosensitive resistors 20 in the same column receives lighting from different positions of the alignment light source respectively.

Figure 4:
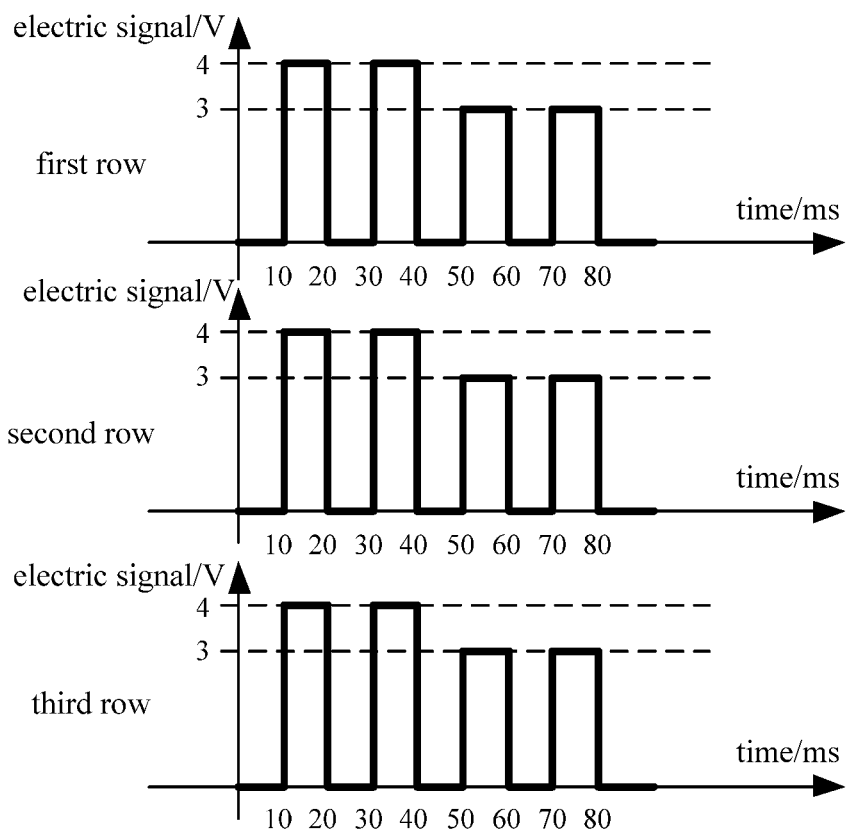
FIG. 4 shows graphs for electric signals received by a signal receiver after passing through each photosensitive resistor according to an embodiment of the present disclosure.

In case that the alignment light source moves at a constant speed in a row arrangement direction of the photosensitive resistors 20, when the alignment light source passes through a orthogonal position of the photosensitive resistors 20 in each column at a constant speed, the light intensity received by the column of photosensitive resistors 20 is the maximum. Thus, the resistance value of the column of photosensitive resistors 20 is the minimum. As shown in FIG. 4, in cooperation with the constant moving speed, the signal transmitter 30 transmits a voltage signal of 4.0V to each column of photosensitive resistors 20 at a time interval of 10 ms, and the signal receiver 40 receives a voltage signal output from each photosensitive resistor 20 in this column at the same time interval. For example, in an ideal state, when the alignment light source moves to an orthogonal position of the photosensitive resistor 20, the resistance of the photosensitive resistor 20 can be approximately taken as zero, and the voltage signal received from the photosensitive resistor 20 can be approximately taken as 4.0V.

Referring to FIG. 4, graphs for the electric signals received by the signal receiver 40 after passing through each row of photosensitive resistors 20 are shown. As can be seen from FIG. 4, starting from the third photosensitive resistor 20 in each row, the received voltage signals all drop to 3.0V, and maintain a voltage signal of 3.0V thereafter. As can be known, the constant moving speed of the alignment light source has changed between the second column of photosensitive resistors 20 and the third column of photosensitive resistors 20. As a result, when the signal receiver 40 receives the electric signals sequentially at a time interval of 10 ms, the alignment light source is not located in the orthogonal position of the column of photosensitive resistors 20. Therefore, the light intensity received by the column of photosensitive resistors 20 is smaller than that at orthogonal projection lighting. So, the resistance value of the photosensitive resistors 20 is not zero. Therefore, the voltage signal received by the signal receiver 40 is smaller than the initial voltage signal transmitted from the signal transmitter 30. In this way, according to the output voltage signal received by the signal receiver 40 after passing through the photosensitive resistors 20, a detection result can be obtained, and the moving speed of the alignment light source can be adjusted accordingly.

Figure 2:
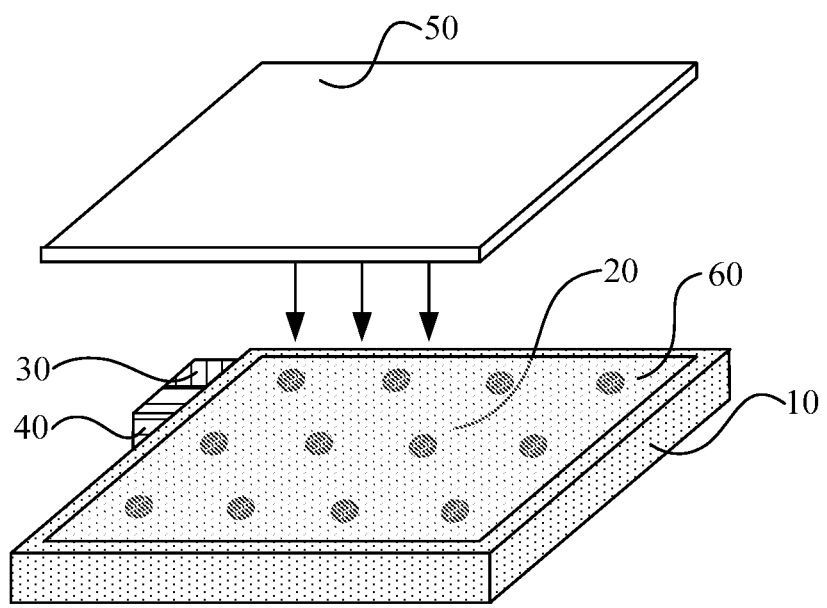
FIG. 2 shows a schematic structure view for a photo alignment bench according to another embodiment of the present disclosure.

Furthermore, as shown in FIG. 2, the photo alignment bench provided by an embodiment of the present disclosure further includes a layer 60 of flattening material. Specifically, the layer 60 of flattening material is arranged on a light sensitive side of the photosensitive resistors 20, such that incident light impinges on the photosensitive resistors 20 at a reduced intensity.

Typically, the light source for photo aligning the substrate 50 to be aligned usually has a greater light intensity, and the photosensitive resistor 20 usually has a fixed tolerance range. Therefore, during photo alignment of the substrate 50 to be aligned, if the local light intensity in each position of the substrate 50 to be aligned is detected by using the photosensitive resistors 20, a light source is required for lighting the photosensitive resistors 20. In this case, if the light intensity exceeds an upper limit of the tolerance range of the photosensitive resistors 20, the detection result of the photosensitive resistors 20 may be inaccurate due to an excessively high light intensity, and failures such as melting loss of the photosensitive resistors 20 or other damages may even be caused.

Therefore, as shown in FIG. 2, a layer 60 of flattening material is further arranged on a side of the platform 10 provided with the photosensitive resistors 20. Specifically, the substrate 50 to be aligned is placed over the layer 60 of the flattening material of the platform 10 in a direction indicated by an arrow in FIG. 2. When the substrate 50 to be aligned is photo-aligned, the light intensity of light emitted from the alignment light source is suitably reduced by means of the layer 60 of flattening material, such that the light intensity received by the photosensitive resistors 20 located below the layer 60 of flattening material can fall within the tolerance range of the photosensitive resistors 20. In this way, on the premise that the light intensity required for the photo alignment of the substrate 50 to be aligned is ensured, it can also be guaranteed that the light intensity received by the photosensitive resistors 20 falls within the tolerance range of the photosensitive resistors 20 themselves. This helps to guarantee the detection accuracy of the photosensitive resistors 20, and reduce the possibility of damage to the photosensitive resistors 20 because of an excessively high light intensity.

In an embodiment of the present disclosure, structures and materials for the layer 60 of flattening material can be flexibly selected upon actual needs, as long as the layer 60 of flattening material has a flattened surface and can reduce the light intensity of light passing therethrough.

In certain exemplary embodiments, as shown in FIG. 2, the layer 60 of flattening material includes a filter.

Using a filter as the layer 60 of flattening material can ensure that the surface of the layer of flattening material 60 is planar. Thereby, the stability of the substrate 50 to be aligned which is placed on the layer of flattening material 60 is improved, and in the meanwhile, surface damage, such as breakage of the substrate 50 to be aligned caused by an excessive stress on a local area since the surface for placement is not flattened, is avoided. Furthermore, when the layer 60 of flattening material is chosen to be a filter, light transmittance of the filter can be adjusted in a larger range through arrangement of materials and parameters of the filter. In this way, requirements for the tolerance range of different types of photosensitive resistors 20 are satisfied. For example, the alignment light source for performing photo alignment on the substrate 50 to be aligned usually emits UV light, and performs alignment with the UV light. In this case, the light extracting efficiency of the UV light emitted from the light source can be correspondingly adjusted by arranging the materials and parameters for the filter. Besides, filter has become a very mature technology. Therefore, when the layer 60 of flattening material is a filter, the manufacturing process is uncomplicated, the manufacturing cost is low, and the product yield of mass production is high.

In certain exemplary embodiments, as shown in FIG. 3, a distance T between any two adjacent photosensitive resistors 20 arranged on the platform 10 is in a range of 1 mm-100 mm.

If the distance T between two adjacent photosensitive resistors 20 is selected to be smaller than 1 mm, the two adjacent photosensitive resistors 20 will be too close to each other. On one hand, an excessively small distance between the photosensitive resistors may result in waste of the photosensitive resistor 20 and meanwhile a huge amount of data to be transmitted and received by the signal transmitter 30 and the signal receiver 40. On the other hand, an excessively small distance between the photosensitive resistors may further result in a small difference in influences of the light intensity on the adjacent photosensitive resistors 20, which increases the difficulty of data processing and reduces the accuracy of detection. If the distance T between two adjacent photosensitive resistors 20 is selected to be greater than 100 mm, the two adjacent photosensitive resistors 20 will be too far from each other. For a normal sized substrate 50 to be aligned, an excessively large distance between the photosensitive resistors makes it difficult to provide a complete detection of light intensity for each local position of the entire substrate 50 to be aligned.

Figure 5:
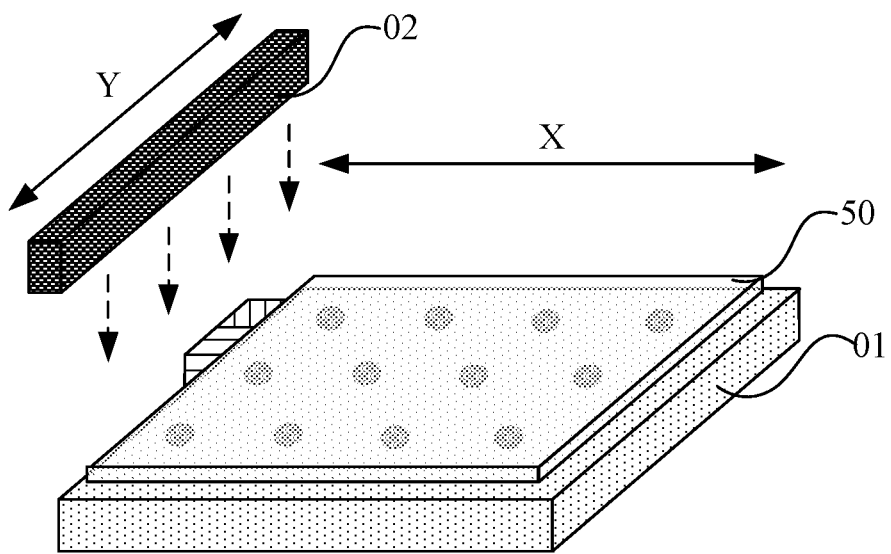
FIG. 5 shows a schematic structure view for a photo alignment device according to an embodiment of the present disclosure.

According to another aspect of the present disclosure, a photo alignment device is further provided. As shown in FIG. 5, the photo alignment device includes the photo alignment bench 01 as described in any of the above embodiments and an alignment light source 02. Specifically, the alignment light source 02 is a linear light source, and the alignment light source 02 emits light towards the photo alignment bench 01 (in a direction indicated by a dashed arrow in FIG. 5). Besides, the photo alignment bench 01 can reciprocate relative to the alignment light source 02 in a linear direction X. Alternatively, the alignment light source 02 can reciprocate relative to the photo alignment bench 01 in a linear direction X. In this case, a length direction Y of the alignment light source 02 is perpendicular to the linear direction X.

For example, FIG. 5 shows an example in which the alignment light source 02 reciprocates relative to the photo alignment bench 01 in a linear direction X.

When the substrate 50 to be aligned is photo aligned by the photo alignment device as provided in an embodiment of the present disclosure, firstly, the substrate 50 to be aligned can be displaced onto the platform 10 of the photo alignment bench 01 by means of a robot or other movement mechanisms. As shown in FIG. 5, the alignment light source 02 is arranged on a side of the photo alignment bench 01, and the alignment light source 02 emits light towards the photo alignment bench 01. In this way, light emitted from the alignment light source 02 can be directly emitted towards the substrate 50 to be aligned which is placed on the photo alignment bench 01, thereby achieving photo alignment. Specifically, the alignment light source 02 is a linear light source, and the relative position between the alignment light source 02 and the photo alignment bench 01 is fixed. In this case, the substrate 50 to be aligned, which falls within a linear range below the orthogonal projection thereof, can be photo aligned. For other positions of the substrate 50 to be aligned, since they are far from the alignment light source 02, the obtained light intensity of the alignment light source 02 is insufficient for accomplishing alignment. In light of that, as shown in FIG. 5, the alignment light source 02 can reciprocate at a constant speed relative to the photo alignment bench 01 in a linear direction X perpendicular to the length direction Y thereof. During the constant speed movement, each position of the substrate 50 to be aligned will be sequentially positioned within a linear range below the orthogonal projection of the alignment light source 02. In other words, linear light emitted from the alignment light source 02 will perform photo alignment in the linear direction X on the substrate 50 to be aligned as located below the orthogonal projection of the alignment light source 02, such that the entire substrate 50 to be aligned which is placed on the photo alignment bench 01 can be photo-aligned.

Likewise, the position of the alignment light source 02 can be fixed, and the photo alignment bench 01 can reciprocate relative to the alignment light source 02 in the linear direction X. In the above specific depictions of photo alignment achieved by the alignment light source 02 reciprocating relative to the photo alignment bench 01 in a linear direction X, the photo alignment operation of the photo alignment device according to an embodiment of the present disclosure and the detection procedure of each position of the substrate 50 to be aligned have been described in detail. The two cases differ only in the way of relative movement, wherein the photo alignment operation and the detection principle are the same, which will not be repeated here for simplicity.

Figure 6:
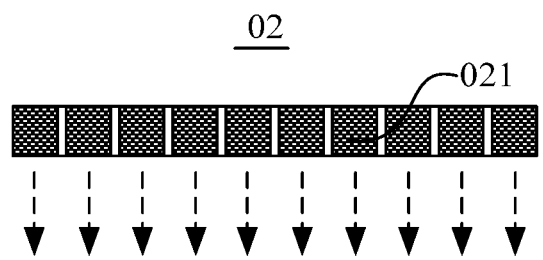
FIG. 6 shows a schematic structure view for an alignment light source in a photo alignment device according to an embodiment of the present disclosure.

In certain exemplary embodiments, as shown in FIG. 6, the alignment light source 02 includes a plurality of spot light sources 021, wherein the plurality of spot light sources 021 are combined to form a linear light source.

In this way, when non-uniformity in photo alignment of the substrate 50 to be aligned is resulted from a failure of a certain spot light source 021 in the alignment light source 02, the failed spot light source 021 can be directly replaced, without replacing the whole alignment light source 02. Thereby, the service life of the whole alignment light source 02 can be improved, and the cost of production process for photo alignment can be cut down.

For example, as shown in FIG. 5, the alignment light source 02 moves at a constant speed in a linear direction X to perform photo alignment on the substrate 50 to be aligned which is placed on the photo alignment bench 01. Referring to FIG. 7, graphs for the electric signals received by the signal receiver 40 on the photo alignment bench 01 after passing through each photosensitive resistor 20 are shown. In an ideal state, a voltage signal of 4.0V is transmitted to each photosensitive resistor 20. When the alignment light source 02 is located in an orthogonal projection position of the photosensitive resistor 20, the resistance of the photosensitive resistor 20 is zero. In this case, the voltage signal passing through the photosensitive resistor 20 and received by the signal receiver 40 is namely 4.0V. The output voltage signal values sequentially received at the same time interval after passing through each row of photosensitive resistors 20 can be determined from FIG. 7. Specifically, values of the voltage signals output after passing through four photosensitive resistors 20 in the second row are all 2V. As can be seen, the light intensities received by the four photosensitive resistors 20 in the second row are all lower than the other photosensitive resistors. In view of above, it can be determined that the spot light source 021 in the alignment light source 02 corresponding to the photosensitive resistors 20 in the second row may have failed due to an exceeded service life or other reasons. This results in an excessively low light intensity in that position. Based on the detection result, the spot light source 021 in the corresponding position can be directly replaced.

Furthermore, according to an embodiment of the present disclosure, the photo alignment device can further include a movement rail 70. Specifically, an extension direction Z of the movement rail 70 is the same as the linear direction X, and the photo alignment bench 01 is arranged within the movement rail 70. Alternatively, the alignment light source 02 is arranged within the movement rail 70.

Referring to FIG. 8, the photo alignment bench 01 as arranged within the movement rail 70 will be described below as an example. An extension direction Z of the movement rail 70 is the same as the linear direction X, and the photo alignment bench 01 is capable of reciprocating relative to the alignment light source 70 within the movement rail 70 in the extension direction of the movement rail 70. Confined by a rail path of the movement rail 70, the photo alignment bench 01 will maintain a straight trajectory and stable movement. This improves the alignment uniformity of the photo alignment for the substrate 50 to be aligned using the photo alignment device as provided in embodiments of the present disclosure.

Besides, it is also possible to dispose the alignment light source 02 within the movement rail 70. If so, the alignment light source 02 will reciprocate within the movement rail 70 relative to the photo alignment bench 01 during the photo alignment. The arrangement and operation manner of the movement rail 70 are the same as that in the above example, which will not be repeated here for simplicity.

It should be further noted that in the photo alignment device as provided in embodiments of the present disclosure, the number of movement rail 70, the positions where they are arranged, the shapes and the structures can all be selected flexibly upon actual needs. The only requirement lies in that the photo alignment bench 01 or the alignment light source 02 can be arranged within the rail, such that the photo alignment bench 01 or the alignment light source 02 can reciprocate in the extension direction of the movement rail 70, and the position where the movement rail 70 is arranged will not occlude lighting of the substrate to be aligned by the alignment light source 02.

In certain exemplary embodiments, as shown in FIG. 8, the photo alignment device as provided in embodiments of the present disclosure can further include a driver 80. Specifically, the driver 80 is arranged at an end of the movement rail 70 in its extension direction Z. Furthermore, the driver 80 is fixedly connected with an end of the photo alignment bench 01, so as to drive the photo alignment bench 01 to reciprocate within the movement rail 70 in the linear direction X. Alternatively, the driver 80 is fixedly connected with an end of the alignment light source 02, so as to drive the alignment light source 02 to reciprocate within the movement rail 70 in the linear direction X.

For example, as shown in FIG. 8, a driver 80 is arranged at an end of the movement rail 70 in its extension direction Z, and the driver 80 is fixedly connected with an end of the photo alignment bench 01. Driven by the driver 80, the photo alignment bench 01 can reciprocate at a constant speed within the movement rail 70 in the linear direction X. The arrangement of the driver 80 ensures a constant speed relative movement between the photo alignment bench 01 and the alignment light source 02. This further improves the alignment uniformity of the photo alignment of the substrate 50 to be aligned using the photo alignment device as provided in embodiments of the present disclosure.

Besides, it is also possible to dispose the alignment light source 02 within the movement rail 70. In this case, a driver 80 is arranged at an end of the movement rail 70 in its extension direction Z, and the driver 80 is fixedly connected with an end of the alignment light source 02. Driven by the driver 80, the alignment light source 02 can reciprocate at a constant speed within the movement rail 70 in the linear direction X. In this case, the arrangement and the operation principle of the driver 80 are the same as that in the above example and have been described in detail therein, which will not be repeated here for simplicity.

Furthermore, as shown in FIG. 8, according to an embodiment of the present disclosure, the photo alignment device can further include a controller 90, and the controller 90 is electrically connected with the signal receiver 40 and the alignment light source 02 respectively (electrical connection lines for the controller 90 are not shown in FIG. 8). In this case, the controller 90 can compare the electric signal received by the signal receiver 40 with a standard value, and adjust a light intensity of the alignment light source 02 based on a comparison result.

In this way, a standard value for the electric signal is preset in the controller 90, wherein the standard value indicates a value of the output electric signal received from the photosensitive resistor 20 in a standard lighting condition after an initial electric signal is transmitted to the photosensitive resistor 20. During photo alignment of the substrate 50 to be aligned by using the photo alignment device, and detection of the photo alignment in each position of the substrate 50 to be aligned, the electric signal received from the signal receiver 40 is directly compared with the standard value in the controller 90. In this case, if the comparison result falls within a set threshold range, the light intensity in a position where the photosensitive resistor 20 is located will be the same as or close to the standard lighting condition. Therefore, the resistance value of the photosensitive resistor 20 is the same as or is close to that of the photosensitive resistor 20 in the standard lighting condition. Therefore, the light intensity in that position can be considered as normal, and the photo alignment effect is acceptable, where no extra processing is required from the controller 90. In contrast, if the comparison result exceeds the preset threshold range, the light intensity in a position where the photosensitive resistor 20 is located is quite different from the standard lighting condition, or the light intensity in a position where the photosensitive resistor 20 is located is too high or too low, the resistance value of the photosensitive resistor 20 will be quite different from that of the photosensitive resistor 20 in the standard lighting condition. Therefore, the light intensity in that position can be considered as abnormal. In this case, the controller 90 can directly adjust the alignment light source 02 corresponding to that position based on the comparison result, thereby decreasing or increasing the corresponding light intensity. Therefore, the light intensity in each position of the whole substrate 50 to be aligned remains equal, thus improving the photo alignment uniformity across the substrate 50 to be aligned.

For example, as shown in FIG. 7, the voltage value of the initial electric signal is set to be 4V. In a standard lighting condition, when the alignment light source is located above the orthogonal projection of the photosensitive resistor 20 and irradiates it perpendicularly, the light intensity received by the photosensitive resistor 20 is high and the resistance value of the photosensitive resistor 20 is low. In this case, the resistance value can be approximately taken as zero, and the initial electric signal nearly suffers no loss after passing through the photosensitive resistor 20. Therefore, the received output electric signal should also be 4V, and the standard value for the electric signal as preset in the controller 90 is namely 4V. In consideration of certain allowable errors, the threshold range can be set to be 3.9V-4V. During photo alignment of the substrate 50 to be aligned by using the photo alignment device and detection of the photo alignment in each position of the substrate 50 to be aligned, the controller 90 can directly compare the output electric signal received by the signal receiver 40 with the standard value. If the output electric signal received by the signal receiver 40 is 4V, it falls within the set threshold range. In this case, the light intensity in that position can be considered as normal, and the photo alignment effect is acceptable, where no extra processing is required from the controller 90. As shown in FIG. 7, if the output electric signal received by the signal receiver 40 is 2V, which obviously falls outside the set threshold range, it means that the light intensity in that position is too low. As a result, the resistance value of the photosensitive resistor 20 is obviously greater than that of the photosensitive resistor 20 in the standard lighting condition. In this case, the controller 90 can directly adjust the alignment light source 02 corresponding to that position based on the comparison result, thereby increasing the light intensity in the corresponding position. If so, the maximum light intensity that can be received by the photosensitive resistor 20 is set as the standard lighting condition. By setting such a standard comparison condition, only differences in light intensities lower than the standard lighting condition can be detected and adjusted.

In another example, the voltage value of the initial electric signal can be set to be 4V. In a standard lighting condition, when the alignment light source is located above the orthogonal projection of the photosensitive resistor 20 and irradiates it perpendicularly, the light intensity received by the photosensitive resistor 20 is sufficient for the photosensitive resistor 20 to have a certain resistance value. This means that the initial electric signal will be output as an electric signal of 3V for instance after passing through the photosensitive resistor 20 under the standard lighting condition. In other words, the standard value for the electric signal as preset in the controller 90 is 3V. In consideration of certain allowable errors, the threshold range can be set as 2.9V-3.1V. During photo alignment of the substrate 50 to be aligned by using the photo alignment device and detection of the photo alignment in each position of the substrate 50 to be aligned, the controller 90 can directly compare the output electric signal received by the signal receiver 40 with the standard value. If the output electric signal received by the signal receiver 40 is 3.1V, it falls within the set threshold range. This means that the light intensity in that position can be considered as normal, and that the photo alignment effect is acceptable, where no extra processing is required from the controller 90. On the contrary, if the output electric signal received by the signal receiver 40 is 2V, which is lower than the lowest value in the set threshold range, it means that the light intensity in that position is too low. As a result, the resistance value of the photosensitive resistor 20 is greater than that of the photosensitive resistor 20 in the standard lighting condition. In this case, the controller 90 can directly adjust the alignment light source 02 corresponding to that position based on the comparison result, thereby increasing the light intensity in the corresponding position. Furthermore, if the output electric signal received by the signal receiver 40 is 3.8V, which is higher than the highest value in the set threshold range, it means that the light intensity in that position is too high. As a result, the resistance value of the photosensitive resistor 20 is smaller than that of the photosensitive resistor 20 in the standard lighting condition. In this case, the controller 90 can directly adjust the alignment light source 02 corresponding to that position based on the comparison result, thereby decreasing the light intensity in the corresponding position. With the help of such a standard comparison condition, both differences in light intensities greater or smaller than the standard threshold range can be detected, and then adjusted and corrected correspondingly based on the detection result.

In certain exemplary embodiments, according to an embodiment of the present disclosure, the photo alignment device can further include a controller 90 in addition to the driver 80. Specifically, the controller 90 is further connected with the driver 80, so as to adjust a driving force applied to the photo alignment bench 01 or the alignment light source 02 by the driver 80.

As shown in FIG. 4, when the constant speed of relative movement between the alignment light source 02 and the photo alignment bench 01 varies, the photo alignment result on the substrate 50 to be aligned will be non-uniform, which gives rise to problems such as an unideal local alignment result or local overexposure. In this case, the controller 90 can be further connected with the driver 80. Therefore, the controller 90 can control the driver 80 based on the detection result, so as to increase or decrease the driving force applied to the photo alignment bench 01 or the alignment light source 02. Therefore, the relative moving speed between the alignment light source 02 and the photo alignment bench 01 can be increased or decreased accordingly, so as to adjust the relative moving speed and maintain a preset constant moving speed.

It should be noted that the standard value as preset in the controller 90 for comparing with the received electric signal can be a value derived from a data table as summarized according to a plurality of photo alignment experiments, or a standard value of factory setting. Of course, the standard value can further include other standard values as obtained by those skilled in the art in other manners, which will not be specifically limited here.

Moreover, it should be further noted that those skilled in the art should know that the light intensity of the alignment light source 02 in a corresponding position of the substrate 50 to be aligned is positively proportional to the voltage signal value as output after passing through the photosensitive resistor 20 in that position. That is, in a same position, the higher the light intensity is, the smaller the resistance value of the photosensitive resistor 20, and the greater the voltage signal as output after passing through the photosensitive resistor 20 is. Contrarily, the lower the light intensity is, the greater the resistance value of the photosensitive resistor 20 is, and the smaller the voltage signal as output after passing through the photosensitive resistor 20 is. Therefore, based on the relationships between the light intensity and the voltage signal as described above, it can be obtained through calculation whether the light intensity should be increased or decreased. Likewise, the specific relationship of value between the light intensity and the voltage signal as described above can be calculated from a formula. Alternatively, a table can be made using data relationship as summarized from a plurality of photo alignment experiments, or by other measures that can be taken by those skilled in the art. The manner in which the relationship is calculated will not be specifically defined here.

Furthermore, it should be further pointed out that when the comparison result does not fall within the preset threshold range, the alignment light source 02 can be adjusted or corrected based on a difference. Specifically, one can look up the table or do calculations in the way as mentioned above, and then use a corresponding value directly. Alternatively, he/she can also make adjustment progressively according to a preset step, and obtain feedbacks from comparison results during the adjustment to make further corrections, until the comparison results are adjusted to fall within the threshold range.

According to yet another aspect of the present disclosure, a method for controlling a photo alignment device is further provided. As shown in FIG. 9, the control method comprises steps as follows.

S101, controlling the signal transmitter 30 to transmit an initial electric signal.

S102, controlling the alignment light source 02 to emit light towards the photo alignment bench 01.

S103, controlling one of the photo alignment bench 01 and the alignment light source 02 to reciprocate with respect to the other in a linear direction X.

S104, controlling the signal receiver to receive an electric signal output from the photosensitive resistors 20, and adjusting based on the output electric signal a light intensity of the alignment light source 02 and/or a moving speed of the one of the photo alignment bench 01 and the alignment light source 02 in the linear direction X.

Specifically, the substrate 50 to be aligned is displaced onto the photo alignment bench 01 by means of a movement mechanism such as a robot, and the alignment light source 02 is switched on. In this case, light from the alignment light source 02 is directly emitted towards the photo alignment bench 01 and the substrate 50 to be aligned which is placed on the photo alignment bench 01.

Firstly, the signal transmitter 30 is controlled to transmit an initial electric signal, and the alignment light source 02 is controlled to emit light towards the photo alignment bench 01. In this case, furthermore, one of the photo alignment bench 01 and the alignment light source 02 is controlled to reciprocate with respect to the other in a linear direction X. Then, the signal receiver 40 receives an electric signal output from the photosensitive resistors 20, and a light intensity of the alignment light source 02 and/or a moving speed of the one of the photo alignment bench 01 and the alignment light source 02 in the linear direction X are adjusted based on the output electric signal.

It should be noted that depending on different detection manners, an initial electric signal can be transmitted at a same time interval from the signal transmitter 30 to each photosensitive resistor 20, during the relative movement of the photo alignment bench 01 and the alignment light source 02 with respect to each other in a linear direction X. Of course, the initial electric signal can also be transmitted to a plurality of photosensitive resistors 20 in each column at a same time interval matching the uniform speed relative movement, as the photo alignment bench 01 and the alignment light source 02 moves with respect to each other in a linear direction X. According to an embodiment of the present disclosure, the control method for the photo alignment device is not limited in this aspect.

Besides, it should be further noted that the detection result can reflect defects such as non-uniform photo alignment. For example, as shown in FIG. 4, in the detection result, for each row of output signals, value abnormalities all start from the third photosensitive resistor 20. As can be known from such a detection result, the relative movement of the photo alignment bench 01 and the alignment light source 02 with respect to each other in a linear direction X has a moving speed error in a position corresponding to the third column of photosensitive resistors 20. In this case, the relative moving speed of the photo alignment bench 01 and the alignment light source 02 with respect to each other in a linear direction X can be adjusted accordingly based on the output electric signal. In another example, as shown in FIG. 7, the output signals after passing through the plurality of photosensitive resistors 20 in the second row are abnormal in the detection result, while the output signals after passing through the plurality of photosensitive resistors 20 in the first and the third rows are normal. It can be known from such a detection result that the spot light source 021 in the alignment light source 02 corresponding to the photosensitive resistors 20 in the second row may have suffered a decrease in the light intensity due to an exceeded service life or a failure. In this case, the light intensity of the alignment light source 02 can be adjusted accordingly based on the output electric signal. Alternatively, when the light intensity of the alignment light source 02 is abnormal, the relative moving speed of the photo alignment bench 01 and the alignment light source 02 with respect to each other in a linear direction X may also be abnormal. In this case, the light intensity of the alignment light source 02 as well as the relative moving speed of the photo alignment bench 01 and the alignment light source 02 with respect to each other in a linear direction X can be adjusted accordingly in a simultaneous manner based on the detection result.

Besides, the plurality of photosensitive resistor 20 in each column, which are parallel to a length direction of the alignment light source 02, can also be connected in series. An initial electric signal is transmitted sequentially to an end of each column at a same time interval, and then an electric signal output from the other end of each column is received sequentially by the signal receiver 40. After that, the relative moving speed of the photo alignment bench 01 and the alignment light source 02 in a linear direction X can be adjusted based on the output electric signal. In spite of saving detection energy consumption, this approach will lose certain detection accuracy and cannot detect light intensity differences in each position of the alignment light source 02. Therefore, it is not a very advantageous approach.

Furthermore, the photo alignment device can further include a driver 90. As shown in FIG. 10, the step of receiving an electric signal output from the photosensitive resistors 20 and adjusting the light intensity of the alignment light source 02 based on the output electric signal can comprise sub-steps of: S1041, comparing the electric signal output from the photosensitive resistors 20 with a standard value, and adjusting the light intensity of the alignment light source 02 corresponding to a photosensitive resistor 20 in a position where an abnormal comparison result occurs.

Specifically, the standard value for the electric signal is preset in the controller 90. During photo alignment of the substrate 50 to be aligned by using the photo alignment device and detection of the photo alignment in each position of the substrate 50 to be aligned, the electric signal received by the signal receiver 40 will be directly compared with the standard value in the controller 90. If the comparison result falls within the preset threshold range, it shows normality.

This means that, the light intensity in that position can be considered as normal, and no further processing is required from the controller 90. If the comparison result falls out of the preset threshold range, it shows an abnormality. This means that, the light intensity in that position can be considered as abnormal, and the controller 90 further adjusts the alignment light source 02 corresponding to that position based on the comparison result, thereby decreasing the light intensity of the spot light source 021 in the corresponding position. Alternatively, it can further prompt to replace the spot light source 021 in that position, such that the light intensity in each position across the whole substrate 50 to be aligned remains equal. This helps to improve the uniformity of photo alignment for the substrate 50 to be aligned.

In the above specific depictions of the operation principle and operation procedure of the photo alignment device, the method for controlling the photo alignment device as provided in embodiments of the present disclosure to perform photo alignment has been described in detail, which will not be repeated herein for simplicity.

The above description is only specific embodiments of the present disclosure, but the protection scope of the present disclosure is not limited thereto. Any variation or substitution, easily conceivable within the technical scope as disclosed in the present disclosure for a skilled person who is familiar with this technical field, shall fall within the protection scope of the present disclosure. Therefore, the protection scope of the present disclosure shall be subject to the protection scope of the claims.

The invention claimed is:

1. A photo alignment bench, comprising:
a platform for supporting a substrate to be aligned;
a plurality of photosensitive resistors on a side of the platform, wherein the photosensitive resistors allow placing the substrate to be aligned; and
a signal transmitter and a signal receiver,
wherein the signal transmitter and the signal receiver are each electrically connected with an end of each photosensitive resistor,
wherein the signal transmitter is adapted for transmitting an initial electric signal to the photosensitive resistors, and
wherein the signal receiver is adapted for receiving an electric signal output from the photosensitive resistors.

2. The photo alignment bench according to claim 1, wherein the plurality of photosensitive resistors are arranged uniformly in a matrix.

3. The photo alignment bench according to claim 1, wherein the plurality of photosensitive resistors are arranged in columns on the platform, and further wherein the signal transmitter transmits a same initial electric signal to photosensitive resistors in a same column simultaneously.

4. The photo alignment bench according to claim 1, further comprising a layer of flattening material, wherein the layer of flattening material is located on a side for receiving light of the photosensitive resistors, such that incident light hits the photosensitive resistors at a reduced intensity.

5. The photo alignment bench according to claim 4, wherein the layer of flattening material comprises a filter.

6. The photo alignment bench according to claim 1, wherein a distance between any two adjacent photosensitive resistors is between 1 mm and 100 mm.

7. A photo alignment device, comprising:
a photo alignment bench comprising:
a platform for supporting a substrate to be aligned;
a plurality of photosensitive resistors on a side of the platform, wherein the photosensitive resistors allow placing the substrate to be aligned; and
a signal transmitter and a signal receiver,
wherein the signal transmitter and the signal receiver are each electrically connected with an end of each photosensitive resistor,
wherein the signal transmitter is adapted for transmitting an initial electric signal to the photosensitive resistors, and
wherein the signal receiver is adapted for receiving an electric signal output from the photosensitive resistors; and
an alignment light source, wherein the alignment light source comprises a linear light source and is configured to emit light towards the photo alignment bench,
wherein either the photo alignment bench or the alignment light source is configured to reciprocate with respect to the other in a linear direction, a length direction of the alignment light source being perpendicular to the linear direction.

8. The photo alignment device according to claim 7, wherein
the alignment light source comprises a plurality of spot light sources arranged in rows.

9. The photo alignment device according to claim 8, further comprising: a movement rail attached to the photo alignment bench for receiving the alignment light source, wherein an extension direction of the movement rail is the same as the linear direction.

10. The photo alignment device according to claim 8, further comprising: a controller, wherein the controller is electrically connected with the signal receiver and the alignment light source respectively, and wherein the controller is configured to compare an electric signal received by the signal receiver with a standard value, and adjust a light intensity of the alignment light source based on a comparison result.

11. The photo alignment device according to claim 7, further comprising: a movement rail for receiving the photo alignment bench or the alignment light source, wherein an extension direction of the movement rail is the same as the linear direction.

12. The photo alignment device according to claim 11, further comprising a driver, wherein the driver is arranged at an end of the movement rail in the extension direction thereof, wherein the driver is fixedly connected with an end of the alignment light source and moves within the movement rail in the linear direction.

13. The photo alignment device according to claim 7, further comprising: a controller, wherein the controller is electrically connected with the signal receiver and the alignment light source respectively, and wherein the controller is configured to compare an electric signal received by the signal receiver with a standard value, and adjust a light intensity of the alignment light source based on a comparison result.

14. The photo alignment device according to claim 13, further comprising: a driver, wherein the controller is further connected with the driver, so as to control a driving force applied to the alignment light source by the driver.

15. The photo alignment device according to claim 7, wherein the plurality of photosensitive resistors are arranged uniformly in a matrix.

16. The photo alignment device according to claim 7, wherein the plurality of photosensitive resistors are arranged in columns on the platform, and the signal transmitter transmits a same initial electric signal to photosensitive resistors in a same column simultaneously.

17. The photo alignment device according to claim 7, wherein the photo alignment bench further comprises a layer of flattening material,
wherein the layer of flattening material is located on a side for receiving light of the photosensitive resistors, such that incident light hits the photosensitive resistors at a reduced intensity.

18. The photo alignment device according to claim 7, wherein a distance between any two adjacent photosensitive resistors is between 1 mm and 100 mm.

19. A method for controlling a photo alignment device to perform photo alignment, comprising:
providing a photo alignment device comprising:
a photo alignment bench comprising:
a platform for supporting a substrate to be aligned;
a plurality of photosensitive resistors on a side of the platform, wherein the photosensitive resistors allow placing the substrate to be aligned; and
a signal transmitter and a signal receiver,
wherein the signal transmitter and the signal receiver are each electrically connected with an end of each photosensitive resistor,
wherein the signal transmitter is adapted for transmitting an initial electric signal to the photosensitive resistors, and
wherein the signal receiver is adapted for receiving an electric signal output from the photosensitive resistors; and
an alignment light source, wherein the alignment light source comprises a linear light source and is configured to emit light towards the photo alignment bench,
wherein either the photo alignment bench or the alignment light source is configured to reciprocate with respect to the other in a linear direction, a length direction of the alignment light source being perpendicular to the linear direction;
controlling a signal transmitter to transmit an initial electric signal;
controlling the alignment light source to emit light towards the photo alignment bench;
controlling one of the photo alignment bench and the alignment light source to move with respect to the other in a linear direction; and
controlling the signal receiver to receive an electric signal output from the photosensitive resistors and adjusting based on the output electric signal at least one of:
a light intensity of the alignment light source, and
a moving speed of the alignment light source in the linear direction.

20. The method according to claim 19, wherein
the photo alignment device further comprises a driver, and
the step of controlling the signal receiver to receive an electric signal output from the photosensitive resistors and adjusting a light intensity of the alignment light source based on the output electric signal comprises:
comparing the electric signal output from the photosensitive resistors with a standard value, and adjusting a light intensity of the alignment light source corresponding to a photosensitive resistor in a position where an abnormal comparison result occurs.

\* \* \* \* \*